(12) United States Patent
Deeba et al.

(10) Patent No.: US 6,727,202 B2
(45) Date of Patent: Apr. 27, 2004

(54) ENHANCED $NO_x$ TRAP HAVING INCREASED DURABILITY

(75) Inventors: Michel Deeba, East Brunswick, NJ (US); Shau-Lin F. Chen, Piscataway, NJ (US); John K. Hochmuth, Bridgewater, NJ (US); Patrick L. Burk, Freehold, NJ (US); Xinyi Wei, Edison, NJ (US)

(73) Assignee: Engelhard Corporation, Iselin, NJ (US)

( * ) Notice: Subject to any disclaimer, the term of this patent is extended or adjusted under 35 U.S.C. 154(b) by 316 days.

(21) Appl. No.: 09/933,586

(22) Filed: Aug. 21, 2001

(65) Prior Publication Data

US 2003/0045424 A1 Mar. 6, 2003

(51) Int. Cl.[7] .......................... B01J 37/02; B01J 20/32; B01J 20/34; B01J 8/00
(52) U.S. Cl. .................... 502/514; 502/11; 502/25; 423/239.1
(58) Field of Search .................. 423/239.1; 502/11, 502/25, 514

(56) References Cited

U.S. PATENT DOCUMENTS

| | | | |
|---|---|---|---|
| 5,792,436 A | * 8/1998 | Feeley et al. | 423/210 |
| 5,837,212 A | 11/1998 | Hepburn | 423/213.2 |
| 5,849,254 A | 12/1998 | Suzuki et al. | 423/213.5 |
| 5,849,659 A | 12/1998 | Tanaka et al. | 502/324 |
| 5,874,057 A | * 2/1999 | Deeba et al. | 423/239.1 |
| 6,089,015 A | 7/2000 | Strehlau et al. | 60/274 |
| 6,105,365 A | 8/2000 | Deeba et al. | 60/274 |
| 6,129,898 A | 10/2000 | Watkins et al. | 423/239.1 |

FOREIGN PATENT DOCUMENTS

| | | | |
|---|---|---|---|
| EP | 0 829 623 A1 | 3/1998 | F01N/3/08 |
| EP | 1 147 802 A1 | 10/2001 | B01D/53/94 |
| FR | 2 793 163 | 11/2000 | B01D/53/92 |
| FR | 2 793 164 | 11/2000 | B01D/53/92 |
| JP | 2001347139 | 12/2001 | B01D/53/94 |
| WO | WO 97/10892 A1 | 3/1997 | B01D/53/94 |
| WO | WO 99/26715 A1 | 6/1999 | B01D/53/88 |
| WO | WO 02/22241 A1 | 3/2000 | B01D/53/94 |
| WO | WO 02/055181 A1 | 7/2000 | B01D/53/94 |
| WO | WO 00/61289 A1 | 10/2000 | B01J/23/34 |
| WO | WO 00/64580 A1 | 11/2000 | B01J/23/34 |
| WO | WO 00/67882 A1 | 11/2000 | B01D/53/94 |
| WO | WO 00/67883 A1 | 11/2000 | B01D/53/94 |
| WO | WO 00/67904 A1 | 11/2000 | B01J/23/34 |
| WO | WO 01/14046 A1 | 3/2001 | B01D/53/94 |
| WO | WO 01/014046 A1 | 3/2001 | B01D/53/94 |
| WO | WO 01/56685 A1 | 8/2001 | B01D/53/94 |

OTHER PUBLICATIONS

U.S. patent application Ser. No. 09/834,505, Chen, filed Apr. 13, 2001.

* cited by examiner

Primary Examiner—Stanley S. Silverman
Assistant Examiner—Jonas N. Strickland
(74) Attorney, Agent, or Firm—Richard A. Negin

(57) ABSTRACT

A catalytic trap disposed in an exhaust passage of an internal combustion engine which is operated with periodic alternations between lean and stoichiometric or rich conditions, for abatement of $NO_x$ in an exhaust gas stream which is generated by the engine. The trap comprises a catalytic trap material and a refractory carrier member on which the catalytic trap material is disposed. The catalytic trap material comprises: (i) a refractory metal oxide support; (ii) a catalytic component effective for promoting the reduction of $NO_x$ under stoichiometric or rich conditions; and (iii) a $NO_x$ sorbent effective for adsorbing the $NO_x$ under lean conditions and desorbing and reducing the $NO_x$ to nitrogen under stoichiometric or rich conditions. The $NO_x$ sorbent comprises a metal oxide selected from the group consisting of one or alkali metal oxides, alkaline earth metal oxides and mixtures of one or more alkali metal oxides and alkaline earth metal oxides. The manganese component is selected from the group consisting of: (1) a manganese oxide, (2) a mixed oxide of manganese and a transition metal and/or a rare earth metal, (3) a compound of an alkali metal and a manganese oxide, (4) a compound of an alkaline earth metal and a manganese oxide and (5) mixtures of the foregoing oxides and compounds.

24 Claims, No Drawings

ENHANCED NO$_x$ TRAP HAVING INCREASED DURABILITY

BACKGROUND OF THE INVENTION

1. Field of the Invention

The present invention relates to a catalyst containing a catalytic trap for treating exhaust gas streams, especially those emanating from lean-burn engines, and to methods of making and using the same. More specifically, the present invention provides a catalyst containing a catalytic trap which abates NO$_x$ in the exhaust streams being treated and exhibits enhanced durability after aging at high temperature and lean operation conditions.

2. Related Art

Emission of nitrogen oxides ("NO$_x$") from lean-burn engines (described below) must be reduced in order to meet emission regulation standards. Conventional three-way conversion ("TWC") automotive catalysts are suitable for abating NO$_x$, carbon monoxide a ("CO") and hydrocarbon ("HC") pollutants in the exhaust of engines operated at or near stoichiometric air/fuel conditions. The precise proportion of air to fuel that results in stoichiometric conditions varies with the relative proportions of carbon and hydrogen in the fuel. An air-to-fuel ("A/F") ratio of 14.65:1 (weight of air to weight of fuel) is the stoichiometric ratio corresponding to the combustion of a hydrocarbon fuel, such as gasoline, with an average formula $CH_{1.88}$. The symbol $\lambda$ is thus used to represent the result of dividing a particular A/F ratio by the stoichiometric A/F ratio for a given fuel, so that; $\lambda=1$ is a stoichiometric mixture, $\lambda>1$ is a fuel-lean mixture and $\lambda<1$ is a fuel-rich mixture.

Engines, especially gasoline-fueled engines to be used for passenger automobiles and the like, are being designed to operate under lean conditions as a fuel economy measure. Such future engines are referred to as "lean-burn engines". That is, the ratio of air to fuel in the combustion mixtures supplied to such engines is maintained considerably above the stoichiometric ratio (e.g., at an air-to-fuel weight ratio of 18:1) so that the resulting exhaust gases are "lean", i.e., the exhaust gases are relatively high in oxygen content. Although lean-burn engines provide enhanced fuel economy, they have the disadvantage that conventional TWC catalysts are not effective for reducing NO$_x$ emissions from such engines because of excessive oxygen in the exhaust. The prior art discloses attempts to overcome this problem by operating lean-burn engines with brief periods of fuel-rich operation (engines which operate in this fashion are sometimes referred to as "partial lean-burn engines"). It is known to treat the exhaust of such engines with a catalyst/NO$_x$ sorbent which stores NO$_x$ during periods of lean (oxygen-rich) operation, and releases the stored NO$_x$ during the rich (fuel-rich) periods of operation. During periods of rich (or stoichiometric) operation, the catalyst component of the catalyst/NO$_x$ sorbent promotes the reduction of NO$_x$ to nitrogen by reaction of NO$_x$ (including NO$_x$ released from the NO$_x$ sorbent) with HC, CO and/or hydrogen present in the exhaust.

The use of NO$_x$ storage (sorbent) components including alkaline earth metal oxides, such as oxides of Ca, Sr and Ba, alkali metal oxides such as oxides of K, Na, Li and Cs, and rare earth metal oxides such as oxides of Ce, La, Pr and Nd in combination with precious metal catalysts such as platinum dispersed on an alumina support, is known, as shown for example, at column 4, lines 19–25, of U.S. Pat. No. 5,473,887. At column 4, lines 53–57, an exemplary composition is described as containing barium (an alkaline earth metal) and a platinum catalyst. The publication *Environmental Catalysts For A Better World And Life*, Proceedings of the 1$^{st}$ World Congress at Pisa, Italy, May 1–5, 1995, published by the Societa Chimica Italiana of Rome, Italy has, at pages 45–48 of the publication, an article entitled *The New Concept 3-Way Catalyst For Automotive Lean-Burn Engine Storage and Reduction Catalyst*, by Takahashi et al. This article discloses the preparation of catalysts of the type described in the aforementioned U.S. Pat. No. 5,473,887 and using these catalysts for NO$_x$ purification of actual and simulated exhaust gases alternately under oxidizing (lean) and reducing (rich or stoichiometric) conditions. The conclusion is drawn in the last sentence on page 46, that NO$_x$ was stored in the catalyst under oxidizing conditions and that the stored NO$_x$ was then reduced to nitrogen under stoichiometric and reducing conditions. A similar but more detailed discussion is contained in SAE Paper 950809 published by the Society of Automotive engineers, Inc., Warrendale, Pa., and entitled *Development of New Concept Three-Way Catalyst for Automotive Lean-Burn Engines*, by Naoto Miyoshi et al, was delivered at the International Congress and Exposition, Detroit, Mich., Feb. 27—Mar. 2, 1995.

U.S. Pat. No. 4,742,038 discloses a metal substrate for carrying a catalytic material useful for the treatment of exhaust gases from internal combustion engines.

U.S. Pat. No. 5,874,057 discloses a method of NO$_x$ abatement utilizing a composition comprising a NO$_x$ abatement catalyst comprising platinum and, optionally, at least one other platinum group metal catalyst which is kept segregated from a NO$_x$ sorbent material. The NO$_x$ sorbent material may be one or more of oxides, carbonates, hydroxides and mixed oxides of one or more of lithium, sodium, potassium, rubidium, magnesium, calcium, strontium and barium.

Prior art catalysts as described above have a problem in practical application, particularly when the catalysts are aged by exposure to high temperatures and lean operating conditions, because after such exposure, such catalysts show a marked decrease in catalytic activity for NO$_x$ reduction, particularly at low temperature (250 to 350° C.) and high temperature (450 to 600° C.) operating conditions.

U.S. Pat. No. 5,451,558 discloses a catalytic material for the reduction of NO$_x$ from a turbine in a power generating stack, although the patent also refers at column 1, lines 13–14, generally to a process and apparatus for reducing pollutants "which are produced by combustion of hydrocarbons or hydrogen in an engine or boiler, and primarily in a gas turbine." As disclosed at column 2, lines 23–37, the turbine exhaust gases are cooled to the range of 250 to 500° F. (about 121 to 260° C.) before contacting the catalytic/adsorbent material (column 2, lines 23–37) and the oxidation is stated (column 2, lines 45–48) to occur at temperatures in the range of 150 to about 425° F. (66 to 218° C.), most preferably in the range of 175 to 400° F. (about 79 to 204° C.). The catalytic species comprises an oxidation catalyst species which may comprise various metals including platinum group metals (see column 3, line 67 through column 4, line 3) deposited on a high surface area support which may be "made of alumina, zirconia, titania, silica or a combination of two or more of these oxides." The catalyst-containing high surface area support is coated with an adsorbent species which may comprise "at least one alkali or alkaline earth compound, which can be a hydroxide compound, bicarbonate compound, or carbonate compound, or mixtures" thereof. At column 3, lines 16–22, the "carbonate coating" is said to be a "lithium, sodium, potassium or calcium carbonate, and presently the preferred coating is a potassium carbonate." At column 4, lines 28–31, however, it is stated that the absorber comprises "most preferably sodium carbonate, potassium carbonate or calcium carbonate." The high surface area support containing the oxidation species and adsorbent may be coated onto "a ceramic or metal matrix structure" as a carrier, see column 4, lines 12–20.

In the '558 patent, the catalytic material is applied to the carrier by coating the carrier with, e.g., platinum-impregnated alumina, and then wetting the alumina with an alkali or alkaline earth carbonate solution, and then drying the wetted alumina. The carrier may be alumina beads or a monolithic ceramic or stainless steel support. The use of a metal monolith support for the catalytic/adsorbent material is suggested at column 5, lines 48–58. There is no suggestion in the '558 patent of criticality of, nor is any importance assigned to, the type of substrate or high surface area support to be used with a particular adsorbent species. In fact, as noted above, silica is one of four high surface area supports taught for use with compositions preferably including a potassium carbonate adsorbent.

WO 01014046 discloses a catalytic trap effective for conversion of $NO_x$ in an exhaust gas stream which is substantially free of silica components and includes a catalytic trap material containing a refractory metal oxide support, e.g., alumina, having dispersed thereon a catalytic component, such as a platinum group metal catalytic component, and a $NO_x$ sorbent comprised of one or more basic oxygenated compounds of potassium. The catalytic trap material is coated onto a suitable carrier member such as one made from stainless steel, titanium, alumina, titania, zirconia or silica-leached cordierite. WO 01014046 also discloses a method of treating a $NO_x$-containing gas stream which involves maintaining the gas stream in alternating periods of lean and rich or stoichiometric conditions and contacting the gas stream with the catalytic trap under conditions in which $NO_x$ is adsorbed during periods of lean operation and released and reduced to nitrogen during periods of rich operation.

U.S. Pat. No. 5,837,212 discloses a nitrogen oxide trap comprising a porous support and catalysts consisting of manganese and potassium on the porous support. The '212 patent indicates that by combining manganese with the potassium, it is possible to eliminate a catalytic component, such as a platinum group metal catalytic component, thereby effecting cost savings. WO 00/61289 and WO 00/67904 are to the same effect. However, the cost savings achieved by eliminating the platinum group metal component are short-lived since the resultant catalytic trap is not durable and deteriorates relatively quickly after exposure to high temperature engine operations which periodically alternate between lean and stoichiometric or rich. The initial cost savings derived by avoiding the use of precious metal components are more than overcome by the material and labor costs associated with frequent replacement of such catalytic trap.

SUMMARY OF THE INVENTION

Generally, the present invention relates to a catalytic trap member having disposed thereon a catalytic trap material comprising a catalytic component effective for the reduction of $NO_x$ and a $NO_x$ sorbent comprising an alkali metal oxide and/or alkaline earth metal oxide and a manganese component.

Specifically, in accordance with the present invention, there is provided a catalytic trap for conversion of $NO_x$ in an exhaust gas stream generated by an internal combustion engine which is periodically alternated between lean and stoichiometric or rich conditions, the catalytic trap comprising the following components: (i) a refractory metal oxide support, (ii) a catalytic component effective for promoting the reduction of $NO_x$ under stoichiometric or rich conditions of the exhaust stream and (iii) a $NO_x$ sorbent effective for adsorbing $NO_x$ under lean conditions of the exhaust gas stream and desorbing $NO_x$ under stoichiometric or rich conditions of the exhaust gas stream and comprising an alkali metal oxide and/or an alkaline earth metal oxide and a manganese component. The catalytic trap is disposed on a refractory carrier member.

DETAILS OF THE INVENTION

The present invention pertains to a catalytic trap for abatement of $NO_x$ in an exhaust gas stream which is generated by an internal combustion engine which is operated with periodic alternations between lean and stoichiometric or rich conditions.

The catalytic trap of the invention comprises:
(A) a catalytic trap material comprising:
   (i) a refractory metal oxide support;
   (ii) a catalytic component effective for promoting the reduction of $NO_x$ under stoichiometric or rich conditions; and
   (iii) a $NO_x$ sorbent effective for adsorbing the $NO_x$ under lean conditions and desorbing and reducing the $NO_x$ to nitrogen under stoichiometric or rich conditions, comprising:
      (a) a metal oxide selected from the group consisting of alkali metal oxides, alkaline earth metal oxides and mixtures of one or more alkali metal oxides and alkaline earth metal oxides; and
      (b) a manganese component selected from the group consisting of (1) a manganese oxide, (2) a mixed oxide of manganese and a transition metal and/or a rare earth metal, (3) a compound of an alkali metal and a manganese oxide, (4) a compound of an alkaline earth metal and a manganese oxide and (5) mixtures of the foregoing oxides and compounds; and
(B) a refractory carrier member on which the catalytic trap material is disposed.

The present invention also pertains to a process for abatement of $NO_x$ in an exhaust gas stream which is generated by an internal combustion engine which is operated with periodic alternations between lean and stoichiometric or rich conditions, comprising locating the above-described catalytic trap in an exhaust passage of the engine and treating the exhaust gas stream with a catalytic trap whereby at least some of the $NO_x$ in the exhaust gas stream is adsorbed by the catalytic trap during the periods of lean conditions and is desorbed from the catalytic trap and reduced to nitrogen during the periods of stoichiometric or rich conditions.

The present invention also pertains to a method for rejuvenating an "aged", i.e., a spent, catalyst which contains:
(A) a catalytic trap material comprising:
   (i) a refractory metal oxide support;
   (ii) a catalytic component effective for promoting the reduction of $NO_x$ under stoichiometric or rich conditions; and
   (iii) a $NO_x$ sorbent effective for adsorbing the $NO_x$ under lean conditions and desorbing and reducing the $NO_x$ to nitrogen under stoichiometric or rich conditions, comprising a metal oxide selected from the group consisting of alkali metal oxides, alkaline earth metal oxides and mixtures of one or more alkali metal oxides and alkaline earth metal oxides; and (B) a refractory carrier member on which the catalytic trap material is disposed.

The spent catalyst is easily and economically rejuvenated by post-impregnating such spent catalyst with an aqueous solution of a manganese component comprising: (a) a manganese salt, e.g., manganese nitrate, acetate, sulfate, hydroxide, etc. or (b) a combination of salts of manganese and a transition metal and/or a rare earth metal or (c) a combination of salts of manganese and an alkali metal or (d) a combination of salts of manganese and an alkaline earth metal or (e) mixtures of the foregoing salts. Thereafter, the post-impregnated catalyst is dried (e.g., at 110° C. for one hour), followed by calcination of the post-impregnated catalyst (e.g., at 550° C. for one hour). The rejuvenated catalyst exhibits the same level of performance in abating $NO_x$, CO and HC pollutants in the exhaust of engines operated at high temperature and lean operating conditions as exhibited by freshly prepared catalysts of the invention in which a manganese component is part of the $NO_x$ sorbent.

The refractory metal oxide support is preferably porous in nature and has a high surface area such as alumina, preferably gamma-alumina. Other suitable support materials include titania, titania-alumina, zirconia, zirconia-alumina, baria-alumina and titania-zirconia. Such support materials, useful for carrying catalyst components, are well known in the prior art. The choice of the support material is not critical to the invention. Desirably, the refractory metal oxide support will have a surface area of between about 5 and about 350 $m^2/g$. Typically, the support will be present in the amount of about 1.5 to about 5.0 g/in3, preferably 2 to 4 $g/in^3$.

For the purposes of the present invention the catalytic component preferably comprises a precious metal component, i.e., a platinum group metal component. Suitable precious metal components include those of platinum, palladium, rhodium and mixtures thereof. Preferably, the precious metal component comprises platinum which is present in an amount of at least about 20% by weight of the total amount of precious metal components. The catalytic component will typically be present in an amount of about 20 to about 200 $g/ft^3$, preferably 50 to 150 $g/ft^3$.

Component (a) of the $NO_x$ sorbent employed in the catalytic trap of the present invention comprises one or more alkali metal oxides, alkaline earth metal oxides, or a mixture of one or more alkali metal oxides and one or more alkaline earth metal oxides. Suitable alkali metal oxides include oxides of potassium, sodium, lithium, cesium and mixtures thereof. Preferably, component (a) comprises potassium oxide.

The alkali metal oxide, if present, is typically employed in an amount of about 0.05 to about 0.75 $g/in^3$, preferably 0.1 to 0.5 $in^3$. If component (a) of the $NO_x$ sorbent contains an alkali metal oxide, it is preferred that neither silica nor any siliceous compound be present in the catalytic trap material or in the refractory carrier member.

Suitable alkaline earth metal oxides include oxides of barium, magnesium, calcium, strontium, zinc and mixtures thereof. Preferably, the alkaline earth metal oxide comprises barium oxide. The alkaline earth metal oxide, if present, is typically employed in an amount of about 0.1 to about 3 $g/in^3$, preferably 0.5 to 2.5 $g/in^3$.

Component (b) of the $NO_x$ sorbent employed in the catalytic trap of the present invention comprises a manganese component which is selected from the group consisting of (1) a manganese oxide, (2) a mixed oxide of manganese and a transition metal and/or a rare earth metal, (3) a compound of an alkali metal and a manganese oxide and (4) a compound of an alkaline earth metal and a manganese oxide and (5) mixtures of the foregoing oxides and compounds. Component (b) will typically will be present in the amount of about 0.05 to about 0.5 $g/in^3$, preferably 0.1 to 0.3 $g/in^3$.

Suitable manganese components include (1) manganese oxides such as $MnO$, $Mn_3O_4$, $Mn_2O_3$, $MnO_2$ and $Mn_2O_7$; (2) mixed oxides of manganese and transition metals and/or rare earth metals such as zirconium, titanium, tin, lanthanum, neodymium, niobium, praseodymium, etc.; (3) compounds of a manganese oxide and an alkali metal such as potassium, sodium, lithium or cesium; (4) compounds of a manganese oxide and an alkaline earth metal such as barium, magnesium, calcium, strontium, zinc, etc.

The catalytic trap of the invention is disposed on a refractory carrier member. Such substrates are well known in the prior art, e.g., stainless steel, titanium, Fecralloy, aluminum zirconate, aluminum titanate, aluminum phosphate, cordierite, mullite and corundum. The carrier member may be employed as a monolithic honeycomb structure, spun fibers, corrugated foils, layered materials, etc. The particular choice of the substrate and its configuration is not critical to the practice of the present invention.

A catalytic device employing a three-way conversion ("TWC") catalyst may be used in conjunction with the catalytic trap of the invention. Such device will be located in an exhaust passage of the internal combustion engine and will be disposed upstream and/or downstream of the catalytic trap. The TWC catalyst would typically include platinum, palladium and rhodium catalytic components dispersed on a high surface area refractory support and may also contain one or more base metal oxide catalytic components such as oxides of iron, manganese or nickel. Such catalysts can be stabilized against thermal degradation by well known expedients such as impregnating an activated alumina support with one or more rare earth metal oxides, e.g., ceria. Such stabilized catalysts can sustain very high operating temperatures. For example, if a fuel cut technique is utilized, temperatures as high as 950° C. may be sustained in the catalytic device.

If the catalytic device is employed and is located upstream of the catalytic trap of the invention, the catalytic device would be mounted close to the exhaust manifold of the engine. In such an arrangement, the TWC catalyst would warm up quickly and provide for efficient cold start emission control. Once the engine is warmed up, the TWC catalyst will remove HC, CO and $NO_x$ from the exhaust gas stream during stoichiometric or rich operation and HC and CO during lean operation. The catalytic trap of the invention would be positioned downstream of the catalytic device where the exhaust gas temperature enables maximum $NO_x$ trap efficiency. During periods of lean engine operation, when $NO_x$ passes through the TWC catalyst, $NO_x$ is stored on the catalytic trap. The catalytic trap is periodically desorbed and the $NO_x$ is reduced to nitrogen under periods of stoichiometric or rich engine operation.

If desired, a catalytic device containing a TWC catalyst may be employed downstream of the catalytic trap of the invention. Such catalytic device will serve to remove further amounts of HC and CO from the exhaust gas stream and, in particular, will provide for efficient reduction of the $NO_x$ to nitrogen under periods of stoichiometric or rich engine operation.

The several components of the catalytic trap material may be applied to the refractory carrier member, i.e., the substrate, as a mixture of two or more components or as individual components in sequential steps in a manner which will be readily apparent to those skilled in the art of catalyst manufacture. A typical method of manufacturing the catalytic trap of the present invention is to provide the catalytic trap material as a coating or layer of washcoat on the walls of the gas-flow passages of a suitable carrier member. This may be accomplished, as is well known in the art, by impregnating a fine particulate refractory metal oxide support material, e.g., gamma alumina, with one or more catalytic metal components such as a precious metal, i.e., platinum group, compound or other noble metals or base metals, drying and calcining the impregnated support particles and forming an aqueous slurry of these particles. Particles of a bulk $NO_x$ sorbent may be included in the slurry. Alternatively, the $NO_x$ sorbent may be dispersed into the support, preferably in a post-dipping operation, as described below. Activated alumina may be thermally stabilized before the catalytic components are dispersed thereon, as is well known in the art, by impregnating it with, e.g., a solution of a soluble salt of barium, lanthanum, rare earth metal or other known stabilizer precursor, and thereafter drying (e.g., at 110° C. for one hour) and calcining (e.g., at 550° C. for one hour) the impregnated activated alumina to form a stabilizing metal oxide dispersed onto the alumina Base metal catalysts may optionally also have been impregnated into the activated alumina, for example, by impregnating a solution of nickel nitrate into the alumina particles and calcining to provide nickel oxide dispersed in the alumina particles.

The carrier may then be immersed into the slurry of impregnated activated alumina and excess slurry removed to provide a thin coating of the slurry on the walls of the gas-flow passages of the carrier. The coated carrier is then dried and calcined to provide an adherent coating of the catalytic component and, optionally, the catalytic trap material, to the walls of the passages thereof. The carrier may then be immersed into a slurry of fine particles of component (a) of the $NO_x$ sorbent as a second or overlayer coating deposited over the layer of catalytic component. A manganese component, e.g., a solution of a manganese salt such as manganese nitrate, acetate, sulfate, hydroxide, etc., may be combined with the slurry of component (a) of the $NO_x$ sorbent or it may be applied as a third or overlayer coating deposited over the second layer of component (a) of the $NO_x$ sorbent. The carrier is then dried and calcined to provide a finished catalyst trap member in accordance with one embodiment of the present invention.

Alternatively, the alumina or other support particles impregnated with the catalytic component may be mixed with bulk or supported particles of the $NO_x$ sorbent in an aqueous slurry, and this mixed slurry of catalytic component particles and $NO_x$ sorbent particles may be applied as a coating to the walls of the gas-flow passages of the carrier. Preferably, however, for improved dispersion of the $NO_x$ sorbent, the washcoat of catalytic component material, after being dried and calcined, is immersed (post-dipped) into a solution of a component (a) of the $NO_x$ sorbent precursor compound (or complex) and a manganese precursor compound (or complex) to impregnate the washcoat with the $NO_x$ sorbent precursor. The impregnated washcoat is then dried and calcined to provide the $NO_x$ sorbent dispersed throughout the washcoat.

Separate discrete layers of washcoat may be applied in successive impregnating/drying/calcining operations, e.g., to provide a bottom washcoat layer containing a platinum catalytic component in a bottom washcoat layer and a palladium and/or rhodium catalytic component in a top washcoat layer. The $NO_x$ sorbent may be dispersed by impregnation into both the top and bottom layers.

In use, the exhaust gas stream which is contacted with the catalytic trap of the present invention is alternately adjusted between lean and stoichiometric/rich operating conditions so as to provide alternating lean operating periods and stoichiometric/rich operating periods. It will be understood that the exhaust gas stream being treated may be selectively rendered lean or stoichiometric/rich either by adjusting the air-to-fuel ratio fed to the engine generating the exhaust or by periodically injecting a reductant into the gas stream upstream of the catalytic trap. For example, the composition of the present invention is well suited to treat the exhaust of engines, including diesel engines, which continuously run lean. In such case, in order to establish a stoichiometric/rich operating period, a suitable reductant, such as fuel, may be periodically sprayed into the exhaust immediately upstream of the catalytic trap of the present invention to provide at least local (at the catalytic trap) stoichiometric/rich conditions at selected intervals. Partial lean-burn engines, such as partial lean-burn gasoline engines, are designed with controls which cause them to operate lean with brief, intermittent rich or stoichiometric conditions.

The following nonlimiting examples shall serve to illustrate the present invention and its advantages over the prior art.

EXAMPLE 1

A reference catalytic trap A was evaluated after aging for 12 hours at 850° C. in a 10% steam/air mixture. Catalytic trap A contained about 125 g/ft$^3$ of a combination of Pt, Pd and Rh present in a ratio of 18/6/1. The combination of the three metals were deposited on a gamma-alumina support which in turn was deposited on a stainless steel substrate followed by drying at 110° C. for one hour and calcining at 550° C. for one hour. The same slurry was applied on the coated catalyst such that the total washcoat loading was about 4 g/in$^3$. Thereafter, catalytic trap A was post-impregnated with a $NO_x$ sorbent consisting of 0.15 g/in$^3$ BaO and 0.45 g/in$^3$ K$_2$O such that the total washcoat loading was about 4.6 g/in$^3$. Catalytic trap A was evaluated in a laboratory reactor using a gas stream containing 500 ppm NO at a 40,000 space velocity between 300 and 600° C. at 50° C. intervals. The $NO_x$ conversion was measured by lean/rich cycling. The cycle was lean at λ 1.5 for 1 minute followed by a 6 second regeneration at λ 0.86. The percent of $NO_x$ conversion was measured by averaging the $NO_x$ conversion obtained from 8 cycles at temperatures between 300 and 600° C. at 50° C. intervals. Such evaluation procedure is known the Lean $NO_x$ trap conversion test which provides an overall $NO_x$ conversion. The test also included a capacity measurement obtained by regenerating the $NO_x$ trap at rich conditions of λ 0.86 for 1 minute followed by lean conditions at λ 1.5. The $NO_x$ trap capacity was measured at 80% $NO_x$ conversion at temperatures between 300 and 600° C. Catalytic trap A exhibited moderate $NO_x$ conversion but poor $NO_x$ capacity as may be seen from the results in Table 1.

EXAMPLE 2

The aged catalytic trap of Example 1 was post-impregnated with an aqueous solution of Mn(NO$_3$)$_2$ followed by drying at 110° C. for 1 hour and calcination at 550°

C. for 1 hour. The $MnO_2$ pickup was 0.2 g/in$^3$. This catalytic trap B was aged again for 12 hours at 850° C. in a 10% steam/air mixture. Thus, catalytic trap B was aged for a total of 24 hours as compared to 12 hours in the case of catalytic trap A. Catalytic trap B was evaluated in the same manner as that set forth in Example 1 for catalytic trap A. As may be seen from the results set forth in Table 1, the performance of catalytic trap A was rejuvenated by the application of the $MnO_2$. Thus, rejuvenated catalytic trap B was superior to reference catalytic trap A.

TABLE 1

| Temp ° C. | Trap A, percent $NO_x$ Conversion | Trap B, percent $NO_x$ Conversion | $NO_x$ Capacity (g/L) Trap A at 80% $NO_x$ Conversion | $NO_x$ Capacity (g/L) Trap B at 80% $NO_x$ Conversion |
|---|---|---|---|---|
| 300 | 12 | 10 | 0 | 0 |
| 400 | 43 | 57 | 0 | 1.1 |
| 450 | 59 | 95 | 0.05 | 2.1 |
| 500 | 70 | 92 | 0.15 | 1.5 |
| 550 | 78 | 80 | 0.3 | 0.75 |

EXAMPLE 3

Two catalytic traps were prepared with the same composition as set forth in Example 1; each trap had a washcoat loading of about 4 g/in$^3$ and precious metal of 125 g/in$^3$ in a ratio of 14/10/1. Reference catalytic trap C contained no manganese oxide, while catalytic trap D was modified by the addition of an aqueous solution of $Mn(NO_3)_2$ followed by drying and calcination as described in Example 2. The $MnO_2$ pickup for catalytic trap D was 0.2 g/in$^3$. Both traps were aged for 12 hours and evaluated as set forth in Example 1. As may be seen from the results set forth in Table 2, catalytic trap D was superior to reference catalytic trap C.

TABLE 2

| Temp. ° C. | Trap C, percent $NO_x$ Conversion | Trap D, percent $NO_x$ Conversion | $NO_x$ Capacity (g/L) Trap C at 80% $NO_x$ Conversion | $NO_x$ Capacity (g/L) Trap D at 80% $NO_x$ Conversion |
|---|---|---|---|---|
| 300 | 22 | 22 | 0 | 0 |
| 400 | 50 | 80 | 0 | 2.1 |
| 450 | 62 | 98 | 0.05 | 2.8 |
| 500 | 78 | 92 | 0.25 | 1.9 |
| 550 | 81 | 79 | 0.65 | 0.65 |

EXAMPLE 4

A manganese-containing $NO_x$ trap was prepared with 75 g/ft$^3$ of precious metal ("PM") consisting of Pt and Rh in the ratio of 5 Pt to 1 Rh. The manganese was present as a composite with zirconia in the ratio of 1 Mn to 2 Zr. The loading of the composite was 1.6 g/in$^3$. Barium and strontium were used as the trapping agents; the barium loading was 0.7 g/in$^3$ and the strontium loading was 0.15 g/in$^3$. For comparative purposes, a second sample containing no PM was prepared.

The samples were evaluated in the fresh state. Thereafter, the samples were aged in a furnace at a temperature of 750° C. for 12 hours in flowing nitrogen containing 10% steam. Following the aging procedure, the samples were re-evaluated. The evaluation consisted of a lean/rich cycle in which the lean segment had a stoichiometry of $\lambda=1.3$ for 60 seconds and the rich segment had a stoichiometry of $\lambda=0.9$ for 6 seconds. The total conversion of $NO_x$ was used as the measure of performance. The performance data are set forth in Table 3 below.

TABLE 3

| Temp. ° C. | $NO_x$ Performance PM Present | $NO_x$ Performance PM Absent |
|---|---|---|
| Fresh Sample | | |
| 307 | 94.5 | |
| 331 | 93.7 | |
| 355 | 93.4 | |
| 379 | 90.1 | |
| 402 | 82.6 | |
| 297 | | 48.2 |
| 325 | | 81.2 |
| 353 | | 83.7 |
| 376 | | 79.6 |
| 399 | | 76.1 |
| 421 | | 66.9 |
| Aged Sample | | |
| 302 | 73.5 | |
| 327 | 92.5 | |
| 351 | 96.1 | |
| 374 | 96.3 | |
| 396 | 94.3 | |
| 294 | | 0.0 |
| 320 | | 1.6 |
| 348 | | 8.1 |
| 372 | | 15.0 |
| 395 | | 10.8 |
| 418 | | 9.9 |

As may be seen from the results set forth in Table 3 above, $NO_x$ performance was poor for the fresh sample containing no PM component as compared with the fresh sample containing the PM component. The difference in $NO_x$ performance is especially dramatic when comparing an aged sample containing no PM component versus the aged sample containing a PM component. These results clearly indicate that a PM component must be present in the sample, whether fresh or aged, in order to achieve satisfactory $NO_x$ performance.

What is claimed is:

1. A process for rejuvenating a spent catalyst, said spent catalyst comprising:
    (A) a catalytic trap material, comprising:
        (i) a refractoty metal oxide support;
        (ii) a catalytic component comprising a precious metal component effective for promoting the reduction of $NO_x$ under stoichiometric or rich conditions; and
        (iii) a $NO_x$ sorbent effective for adsorbing the $NO_x$ under lean conditions and desorbing and reducing the $NO_x$ to nitrogen under stoichiometric or rich conditions, comprising a metal oxide selected from the group consisting of alkali metal oxides, alkaline earth metal oxides and mixtures of one or more alkali metal oxides and alkaline earth metal oxides; and
    (B) a refractory carrier member on which the catalytic trap material is disposed, said process comprising the steps of;
        (1) post-impregnating the spent catalyst with an aqueous solution of a manganese component comprising:
            (a) a manganese salt or (b) a combination of salts of manganese and a transition metal and/or a rare earth metal or (c) a combination of salts of manganese and an alkali metal or (d) a combination of salts of manganese and an alkaline earth metal or (e) mixtures of the foregoing salts; and (2) drying and calcining the post-impregnated catalyst resulting from step (1).

2. The process of claim 1 wherein the support is selected from the group consisting of alumina, titania, titania-alumina, zirconia, zirconia-alumina, baria-alumina and titania-zirconia.

3. The process of claim 2 wherein the support comprises gamma-alumina.

4. The process of claim 1 wherein the support is present in an amount of about 1.5 to about 5.0 g/in$^3$.

5. The process of claim 4 wherein the support is present in an amount of 2 to 4 g/in$^3$.

6. The process of claim 1 wherein the precious metal component is selected from the group consisting of platinum, palladium, rhodium components and mixtures thereof.

7. The process of claim 6 wherein the precious metal component comprises platinum which is present in an amount of at least about 20% by weight of the total amount of precious metal components.

8. The process of claim 1 wherein the precious metal component is present in an amount of about 20 to about 200 g/ft$^3$.

9. The process of claim 8 wherein the precious metal component is present in the amount of 50 to 150 g/ft$^3$.

10. The process of claim 1 wherein the alkali metal oxide is selected from the group consisting of oxides of potassium, sodium, lithium, cesium and mixtures thereof.

11. The process of claim 10 wherein the NO$_x$ sorbent comprises potassium oxide.

12. The process of claim 1 wherein the alkali metal oxide, if present, is present in an amount of about 0.05 to about 0.75 g/in$^3$.

13. The process of claim 12 wherein the alkali metal oxide, if present, is present in an amount of 0.1 to 0.5 g/in$^3$.

14. The process of claim 1 wherein the alkaline earth metal oxide is selected from the group consisting of oxides of barium, magnesium, calcium, strontium and mixtures thereof.

15. The process of claim 14 wherein the alkaline earth metal oxide comprises barium oxide.

16. The process of claim 1 wherein the alkaline earth metal oxide, if present, is present in an amount of about 0.1 to about 3 g/in$^3$.

17. The process of claim 16 wherein the alkaline earth metal oxide, if present, is present man amount of 0.5 to 2.5 g/in$^3$.

18. The process of claim 1 wherein the manganese component is present in the post-impregnated catalyst in an amount of about 0.05 to about 0.5 g/in$^3$.

19. The process of claim 18 wherein the manganese component is present in the post-impregnated catalyst in an amount of 0.1 to 0.3 g/in$^3$.

20. The process of claim 1 wherein the manganese salt is selected from the group consisting of manganese nitrate, manganese acetate, manganese sulfate and manganese hydroxide.

21. The process of claim 1 wherein the transition metal is selected from the group consisting of zirconium, titanium and tin, and the rare earth metal is selected from the group consisting of lanthanum, neodymium, niobium and praseodymium.

22. The process of claim 1 wherein the alkali metal present in the aqueous solution is selected from the group consisting of potassium, sodium, lithium and cesium.

23. The process of claim 1 wherein the alkaline earth metal present in the aqueous solution is selected from the group consisting of barium, magnesium, calcium, strontium, and zinc.

24. The process of claim 1 wherein the carrier member is selected from the group consisting of stainless steel, titanium, Fecralloy, aluminum zirconate, aluminum titanate, aluminum phosphate, cordierite, mullite and corundum.

* * * * *